(12) United States Patent
Marce

(10) Patent No.: US 7,113,483 B2
(45) Date of Patent: Sep. 26, 2006

(54) DICHOTOMY-BASED METHOD OF TRACING A ROUTE BETWEEN TWO NODES OF A DATA NETWORK

(75) Inventor: Olivier Marce, Massy (FR)

(73) Assignee: Alcatel, Paris (FR)

( * ) Notice: Subject to any disclaimer, the term of this patent is extended or adjusted under 35 U.S.C. 154(b) by 1001 days.

(21) Appl. No.: 10/090,748

(22) Filed: Mar. 6, 2002

(65) Prior Publication Data

US 2002/0131367 A1    Sep. 19, 2002

(30) Foreign Application Priority Data

Mar. 15, 2001 (FR) .................................. 01 03530

(51) Int. Cl.
*H04L 12/28* (2006.01)
*G06F 15/173* (2006.01)
(52) U.S. Cl. ...................... 370/248; 370/255; 370/389; 709/238
(58) Field of Classification Search ................. 370/254, 370/351, 389, 395.31, 395.32, 255, 248; 709/238
See application file for complete search history.

(56) References Cited

U.S. PATENT DOCUMENTS 5,675,741 A    10/1997    Aggarwal et al.
5,901,141 A  *  5/1999    Gruber et al. .............. 370/248

OTHER PUBLICATIONS

Paul E. Black and Conrado Martinez, "divide and conquer", from Dictionary of Algorithms and Data Structures, Paul E. Black, ed., NIST.□□http://www.nist.gov/dads/HTML/divideAndConquer.html.*
Paul E. Black, "binary search", from Dictionary of Algorithms and Data Structures, Paul E. Black, ed., NIST□□http://www.nist.gov/dads/HTML/binarySearch.html.*

* cited by examiner

*Primary Examiner*—Chau Nguyen
*Assistant Examiner*—Kerri M. Dyke
(74) *Attorney, Agent, or Firm*—Sughrue Mion, PLLC

(57) ABSTRACT

A method of tracing a route between an origin node and a target node within a TCP/IP data network, consisting of sending in a dichotomy-based fashion a succession of messages for tracing the route. The advantage of this method is that it reduces the number of messages necessary for tracing the route.

6 Claims, 2 Drawing Sheets

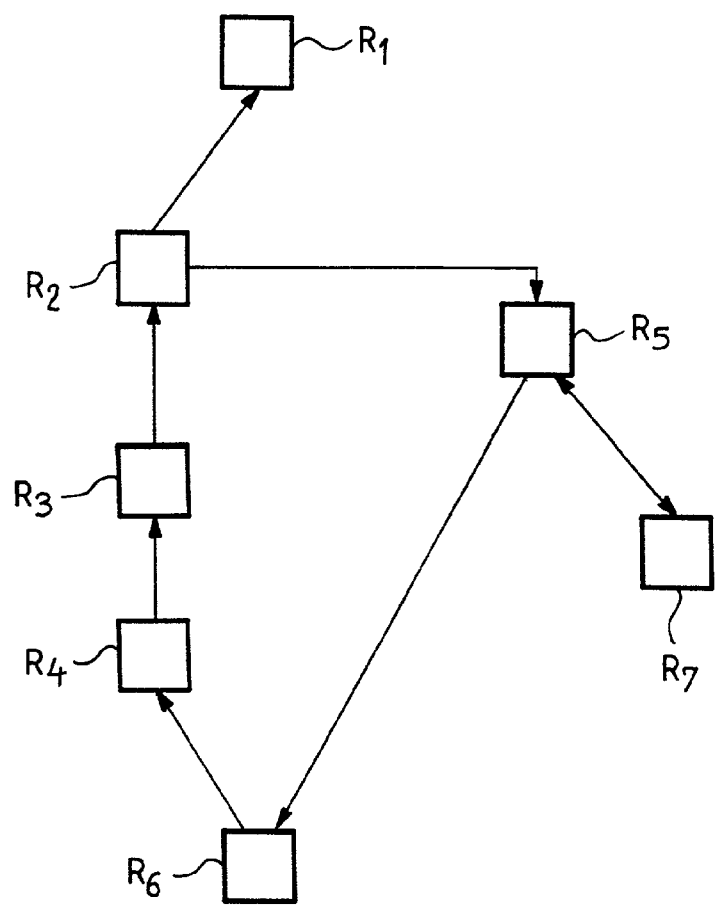
FIG_1
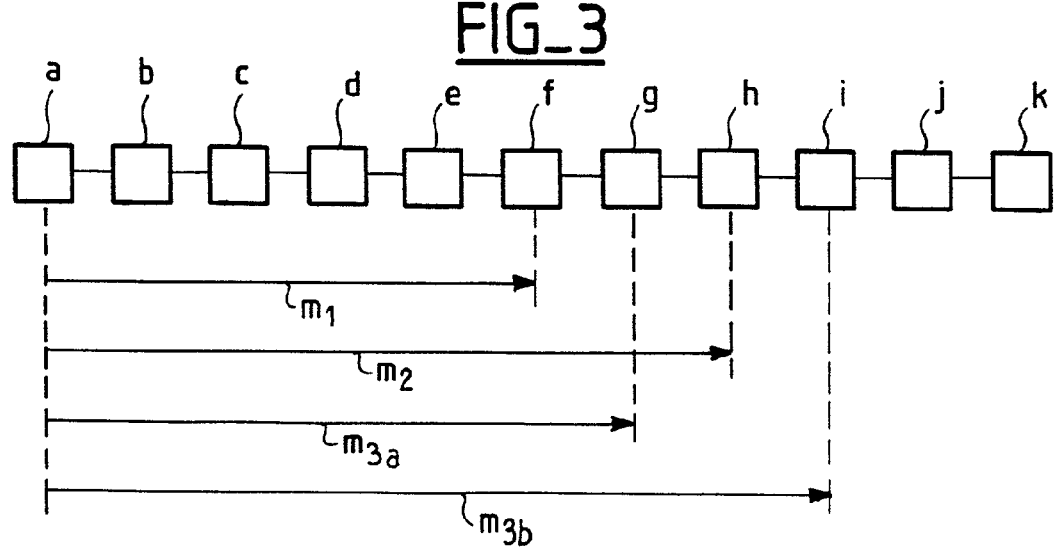
FIG_3

FIG_2a
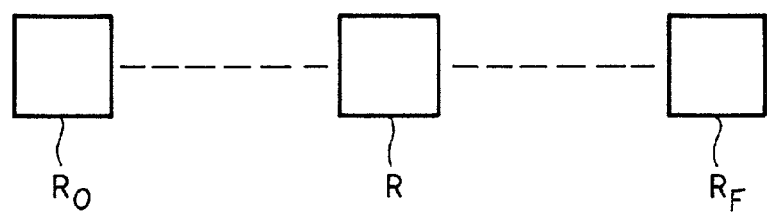
FIG_2b
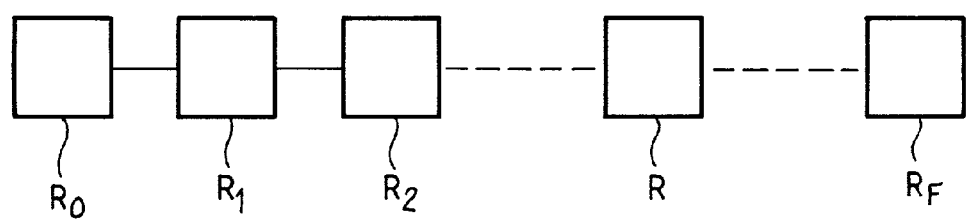
FIG_2c
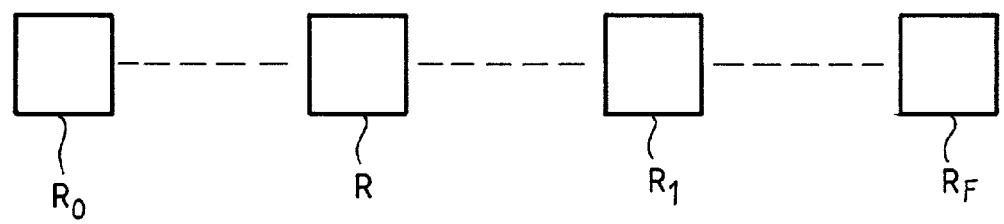

DICHOTOMY-BASED METHOD OF TRACING A ROUTE BETWEEN TWO NODES OF A DATA NETWORK

The present invention relates to a method of tracing a route between two nodes of a data network using protocols of the Transmission Control Protocol/Internet Protocol (TCP/IP) family.

BACKGROUND OF THE INVENTION

In accordance with protocols of the Transmission Control Protocol/Internet Protocol (TCP/IP) family, each node of the network typically has a view of only a portion of the network, with the result that the routing function is distributed across the network without any of the nodes knowing the complete route taken by the data packets.

The routing protocol can be the Transmission Control Protocol (TCP) or the User Datagram Protocol (UDP), for example.

In most cases, these protocols are sufficient because the sender of a packet is generally interested only in the actual transmission of their packet, and not in the exact route that it takes. Nevertheless, there are a few applications in which a knowledge of the complete route taken by the packets is at least important, if not essential.

One such application is the broadcasting of packets to a plurality of destinations, for example, as shown in FIG. 1 and as described in Request for Comments (RFC) 1054, entitled "Host Extensions for IP Multicasting".

FIG. 1 shows seven nodes $R_1, R_2, R_3, \ldots, R_7$. The node $R_1$ sends out data packets. The data packets typically form part of a data stream, for example a video data stream. Also shown in the figures are arrows corresponding to the directions in which information is communicated between the nodes. The double-headed arrows represent symmetrical communications.

The nodes $R_6$ and $R_7$ are to receive the data stream. They therefore send to the source $R_1$ of the stream a registration message, for example a "Join" message of the Internet Group Management Protocol (IGMP) as defined in RFC 1112.

The registration message from the node $R_7$ passes through the nodes $R_5$ and $R_2$ before reaching the source node $R_1$. The registration message from the node $R_6$ also passes through the nodes $R_4$, $R_3$, $R_2$ and $R_1$.

The data stream is therefore transmitted at the same time to the node $R_2$ for transmission to the node $R_6$ and to the node $R_5$ for transmission to the node $R_5$.

If the node $R_1$ had known the exact route to each of the destination nodes, it would have transmitted a single data stream to the node $R_5$, for the latter to duplicate that stream, both to the node $R_7$ and to the node $R_6$.

Thus a lack of knowledge of the complete route between the nodes rules out optimum use of the data network and overloads it unnecessarily.

One solution to knowing a route between two nodes is the "TraceRoute" software, the first versions of which date from 1988.

Its basic principle consists of setting an increasing time to live for a packet sent to the node to which a route is looked for. Each node passed through decrements the time to live of the packet by one unit. When the time to live reaches 0, the node that has received the packet no longer transmits it, but sends the sender a Time To Live Exceeded message, inserting its identifier into the message. Accordingly, a simple method used by the TraceRoute software consists of transmitting a packet with a time to live of 1, then 2, 3, etc. until the target node is finally reached. The complete route to the target node can be reconstructed by storing in memory each time the node sending the Time To Live Exceeded message.

However, a method of this kind has the major drawback of necessitating a large number of packets. In a real world data network, the size of the routes can be large and can therefore imply an excessive number of packets and Time To Live Exceeded messages.

A similar method is disclosed in U.S. Pat. No. 5,675,741, entitled "Method and apparatus for determining a communications route between two nodes in an Internet Protocol (IP) network". This is also an iterative method. The number of packets transmitted is therefore proportional to the size of the route looked for. The method can therefore lead to congestion of the network because of the proliferation of these route tracing messages.

OBJECT AND SUMMARY OF THE INVENTION

The object of the present invention is therefore to reduce the number of packets needed to determine a complete route between two nodes, and therefore to reduce the congestion of the data network.

To this end, the invention provides a method of tracing a route between an origin node and a target node of a TCP/IP data network, the method consisting of defining a route tracing function having for parameters a start distance and an end distance and including the following steps:
stopping the recursive processing of the function if the start and end difference differ by one unit,
sending a message to the target node, with a time to live equal to an intermediate value between the start and end distances,
receiving a response and:
if said response comes from the target node, storing it in the list of known nodes and executing the tracing function recursively with the start distance and the target node distance as parameters,
if said response is a Time To Live Exceeded message coming from an intermediate node in the list of known nodes, executing the tracing function recursively with the intermediate node distance and said end distance as parameters, and
if said response is a Time To Live Exceeded message coming from an intermediate node that is not in said list of known nodes, storing said intermediate node in the list of known nodes and executing the tracing function recursively, a first time with the start distance and the intermediate node distance as parameters and a second time with the intermediate node distance and the end distance as parameters.

The method then consists of initially executing said route tracing function with a start distance equal to 0.

Accordingly, by using a dichotomy-based method, the number of packets transmitted can be significantly reduced. This number becomes of the same order of magnitude as the logarithm of the complete route.

BRIEF DESCRIPTION OF THE DRAWINGS

The invention and its advantages will become more clearly apparent in the course of the following description, which is given with reference to the accompanying drawings.

FIG. 1, previously commented on, represents a data network and one application of the invention.

FIGS. 2a, 2b and 2c illustrate three situations arising in a method according to the invention after receiving a response.

FIG. 3 is a diagram of a practical example of the use of the invention.

MORE DETAILED DESCRIPTION

The first step of a method according to the invention consists of executing the route tracing function by specifying a start distance equal to 0 and an end distance which is preferably equal to twice the average of the distances of the nodes included in the list of known nodes.

This latter value is justified on statistical grounds: it is assumed that the target node distance is equal to the average of the distances of the nodes already known, and the target node is considered to be at a distance at most equal to twice the average distance.

The route tracing function first sends the target node a message having a fixed time to live.

A time to live for a message can be fixed using a Time To Live (TTL) field, as specified in RFC 791. The TTL field is decremented by one unit at each node through which the message passes. When it reaches 0, the message is no longer transmitted and a Time To Live Exceeded message is sent to the sender of the message.

The message is typically an ICMP ECHO message, conforming to the Internet Control Message Protocol (ICMP) as defined in RFC 792.

The Time To Live Exceeded message is an ICMP "TTL exceeded" message, conforming to the same protocol.

According to one feature of the invention, if the target node receives the ICMP ECHO message, it responds to the sender with a message containing at least its identifier.

Accordingly, the node executing the method according to the invention is faced with the three situations shown in FIGS. 2a to 2c. In those figures, $R_O$ and $R_F$ respectively represent the origin and final nodes.

FIG. 2a shows the situation in which the response comes from the target node. This means that the target node R is at a shorter distance than predicted. The tracing function is therefore executed recursively, fixing the same start distance (thus originally a distance equal to 0) and an end distance equal to the target node distance. In other words, the objective is to trace the route leading to the target node R.

FIG. 2b shows the situation in which the response is a Time To Live Exceeded message coming from an intermediate node that is in the list of known nodes. This represents the situation in which the target node R is farther than expected. However, as the node $R_2$ that has responded is already known, it is necessary to look for the target node between that intermediate node and the node corresponding to the end distance.

The tracing function is therefore executed with the intermediate node $R_2$ distance and the end distance as parameters.

The third situation is that in which the response is a Time To Live Exceeded message, as in the previous situation, but this time comes from an intermediate node that is not in the list of known nodes. FIG. 2c shows this situation. It represents the situation in which the target node is farther than predicted and the intermediate node $R_1$ is not in the list of known nodes. It is therefore necessary to look simultaneously for the target node R, which is necessarily beyond the intermediate node $R_1$, and for the route leading to that intermediate node.

In this situation, the intermediate node is stored in the list of known nodes and the tracing function is executed recursively, first with the start distance and the intermediate node distance as parameters and then with the intermediate node distance and the end distance as parameters.

The recursive processing is stopped when the start and end distances differ by only one unit.

FIG. 3 shows one example of the use of the method according to the invention.

The figure shows the nodes a, b, . . . , k of a route. The node a is the node at which the route determination method is executed. It is assumed that the average length of the known routes is 5, and that the target node is the node i. It is also assumed that all the nodes up to the node f inclusive are in the list of known nodes.

The route tracing function is initially executed with the parameters 0 and 10 (twice the average length of the known routes).

A packet $m_1$ is then sent to the node i with a time to live equal to 5 (the average of 0 and 10).

The packet reaches the node f, which sends back a Time To Live Exceeded message.

Because the node f is in the list of known nodes, the route tracing function is then executed with the parameters 5 and 10.

A second packet $m_2$ is then sent to the node i with a time to live equal to 7 (the rounded down average of 5 and 10).

The packet reaches the node h, which sends back a Time To Live Exceeded message.

The node h is not in the list of known nodes.

It is therefore added to the list of known nodes, and the route tracing function is executed twice.

A first time with 5 (old start distance) and 7 (node h distance) as parameters.

A second time with 7 (node h distance) and 10 (old end distance) as parameters.

In the first execution of the route tracing function, a packet $m_{3a}$ is sent to the node i with a time to live equal to 6, the average of the parameters 5 and 7.

The packet $m_{3a}$ therefore reaches the node g, which sends back a Time To Live Exceeded message.

The node g is not in the list of known nodes. It is therefore added to the list.

As the distances 5 and 6, on the one hand, and 6 and 7, on the other hand, differ by only one unit, the recursive processing stops here.

In the second execution of the route tracing function, a packet $m_{3b}$ is sent to the node i with a time to live equal to 7, the rounded down average of the parameters 7 and 10.

The packet $m_{3b}$ reaches the node i, which is the target node. The node i then responds by inserting its identifier into the response message.

On receiving this message, the node has inserted the node i in the list of known nodes for the same reasons as for the first execution, and the recursive processing stops here.

Thus, subject to sending four packets $m_1$, $m_2$, $m_{3a}$, $m_{3b}$, the node i and the complete route leading to it have been traced and added to the list of known nodes.

The invention claimed is:

1. A method of tracing a route between an origin node and a target node of a TCP/IP data network, the method comprising:
   defining a route tracing function having a start distance and an end distance;
   sending a message to said target node with a Time To Live setting equal to an intermediate value between the start and end distances;

receiving a response;

if said response comes from the target node, storing it in a list of known nodes and executing the tracing function recursively with the start distance and a target node distance as parameters;

if said response is a Time To Live Exceeded message from an intermediate node in said list of known nodes, executing the tracing function recursively with an intermediate node distance and said end distance as parameters;

if said response is a Time To Live Exceeded message from an intermediate node that is not in said list of known nodes, storing said intermediate node in the list of known nodes and executing the tracing function recursively, a first time with the start distance and the intermediate node distance as parameters and a second time with the intermediate node distance and the end distance as parameters;

initially executing said route tracing function with a start distance equal to 0; and stopping the recursive processing of the function if the start and end distance differ by one unit;

wherein the Time to Live Exceeded response from the intermediate node is sent if the message exceeds the Time To Live setting.

2. A method according to claim 1, wherein said intermediate value equals an average of the start and end distances.

3. A method according to claim 1, wherein the end distance is initially fixed at twice an average of distances of nodes in said list of known nodes.

4. A method according to claim 1, wherein said time to live is stored in a Time To Live field conforming to RFC 791.

5. A method according to claim 1, wherein said message and said response conform to ICMP defined by RFC 792.

6. A computer-readable medium capable of tracing a route between an origin node and a target node of a TCP/IP data network having computer-executable instructions for performing steps comprising:

defining a route tracing function having a start distance and an end distance;

sending a message to said target node with a Time To Live setting equal to an intermediate value between the start and end distances;

receiving a response;

if said response comes from the target node, storing it in a list of known nodes and executing the tracing function recursively with the start distance and a target node distance as parameters;

if said response is a Time To Live Exceeded message from an intermediate node in said list of known nodes, executing the tracing function recursively with an intermediate node distance and said end distance as parameters;

if said response is a Time To Live Exceeded message from an intermediate node that is not in said list of known nodes, storing said intermediate node in the list of known nodes and executing the tracing function recursively, a first time with the start distance and the intermediate node distance as parameters and a second time with the intermediate node distance and the end distance as parameters;

initially executing said route tracing function with a start distance equal to 0; and stopping the recursive processing of the function if the start and end distance differ by one unit;

wherein the Time to Live Exceeded response from the intermediate node is sent if the message exceeds the Time To Live setting.

* * * * *